(12) United States Patent
Lin

(10) Patent No.: US 7,263,835 B2
(45) Date of Patent: *Sep. 4, 2007

(54) ICE CUBE MAKER

(76) Inventor: Ching-Yu Lin, No. 30, Lane 455, Yuehmei Rd., Luodong Chen, Yilan Hsien (TW)

( * ) Notice: Subject to any disclaimer, the term of this patent is extended or adjusted under 35 U.S.C. 154(b) by 195 days.

This patent is subject to a terminal disclaimer.

(21) Appl. No.: 11/126,162

(22) Filed: May 11, 2005

(65) Prior Publication Data

US 2006/0254285 A1 Nov. 16, 2006

(51) Int. Cl.
F25B 21/02 (2006.01)
F25C 1/00 (2006.01)

(52) U.S. Cl. .......................................... 62/3.63; 62/66

(58) Field of Classification Search ................ 62/3.62, 62/3.63, 71–73, 66, 135–139, 233, 340, 351, 62/353
See application file for complete search history.

(56) References Cited

U.S. PATENT DOCUMENTS

| | | | | |
|---|---|---|---|---|
| 2,990,692 A * | 7/1961 | Hubacker et al. | .............. | 62/71 |
| 3,238,740 A * | 3/1966 | Ross | .......................... | 62/354 |
| 3,308,631 A * | 3/1967 | Kniffin | ........................ | 62/137 |
| 3,327,713 A * | 6/1967 | Eidus | .......................... | 607/96 |
| 3,407,619 A * | 10/1968 | Walker | ........................ | 62/137 |
| 4,835,978 A * | 6/1989 | Cole | ............................ | 62/137 |
| 5,921,103 A * | 7/1999 | Hilsinger | ..................... | 62/340 |
| 5,953,924 A * | 9/1999 | Li et al. | ........................ | 62/71 |
| 6,401,461 B1 * | 6/2002 | Harrison et al. | ............. | 62/3.61 |
| 6,453,696 B1 * | 9/2002 | Kawasumi et al. | ........... | 62/344 |
| 6,820,433 B2 * | 11/2004 | Hwang | ........................ | 62/3.63 |
| 6,951,113 B1 * | 10/2005 | Adamski | ..................... | 62/3.62 |

FOREIGN PATENT DOCUMENTS

JP         2-230073 A   *   9/1990

* cited by examiner

Primary Examiner—Mohammad M. Ali
(74) Attorney, Agent, or Firm—Hershkovitz & Associates; Abe Hershkovitz

(57) ABSTRACT

An ice cube maker has an ice tray, a thermoelectric cooling chip, a heat sink and a fan sequentially mounted together. The ice tray has a top surface and multiple recesses formed in the top surface. When liquid is placed in the recesses in the ice tray, the thermoelectric cooling chip freezes the liquid and forms ice cubes. The ice cube maker allows people who do have a refrigerator to make ice cubes. The ice cubes do not have any strange smell.

4 Claims, 3 Drawing Sheets

ICE CUBE MAKER

BACKGROUND OF THE INVENTION

1. Field of the Invention

The present invention relates to an ice cube maker, and more particularly to an ice cube maker that is able to make ice cubes anywhere, and the ice cubes will not take on any strange smell.

2. Description of Related Art

A conventional refrigerator is able to keep food fresh and also make ice cubes. A conventional way to make ice cubes is to put liquid into an ice tray and put the ice tray into the refrigerator freezer. When the liquid freezes, the ice cubes are done. However, the ice cubes may take on a food smell. The smell of the ice cubes may be very terrible.

Furthermore, some people do not have a refrigerator in their apartment or house. For these people, making their own ice cubes is virtually impossible.

The present invention provides an ice cube maker to obviate or mitigate the aforementioned problems.

SUMMARY OF THE INVENTION

The primary objective of the present invention is to provide an improved ice cube maker that allows people to make ice cubes anywhere, and the ice cubes will not take on any strange smell.

The ice cube maker has an ice tray, a thermoelectric cooling chip, a heat sink and a fan sequentially mounted together. The ice tray has a top surface and multiple recesses formed in the top surface. When liquid is placed in the recesses of the ice tray, the thermoelectric cooling chip freezes the liquid and forms ice cubes. The ice cube maker allows people who do not have a refrigerator to make ice cubes. The ice cubes do not have any strange smell.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
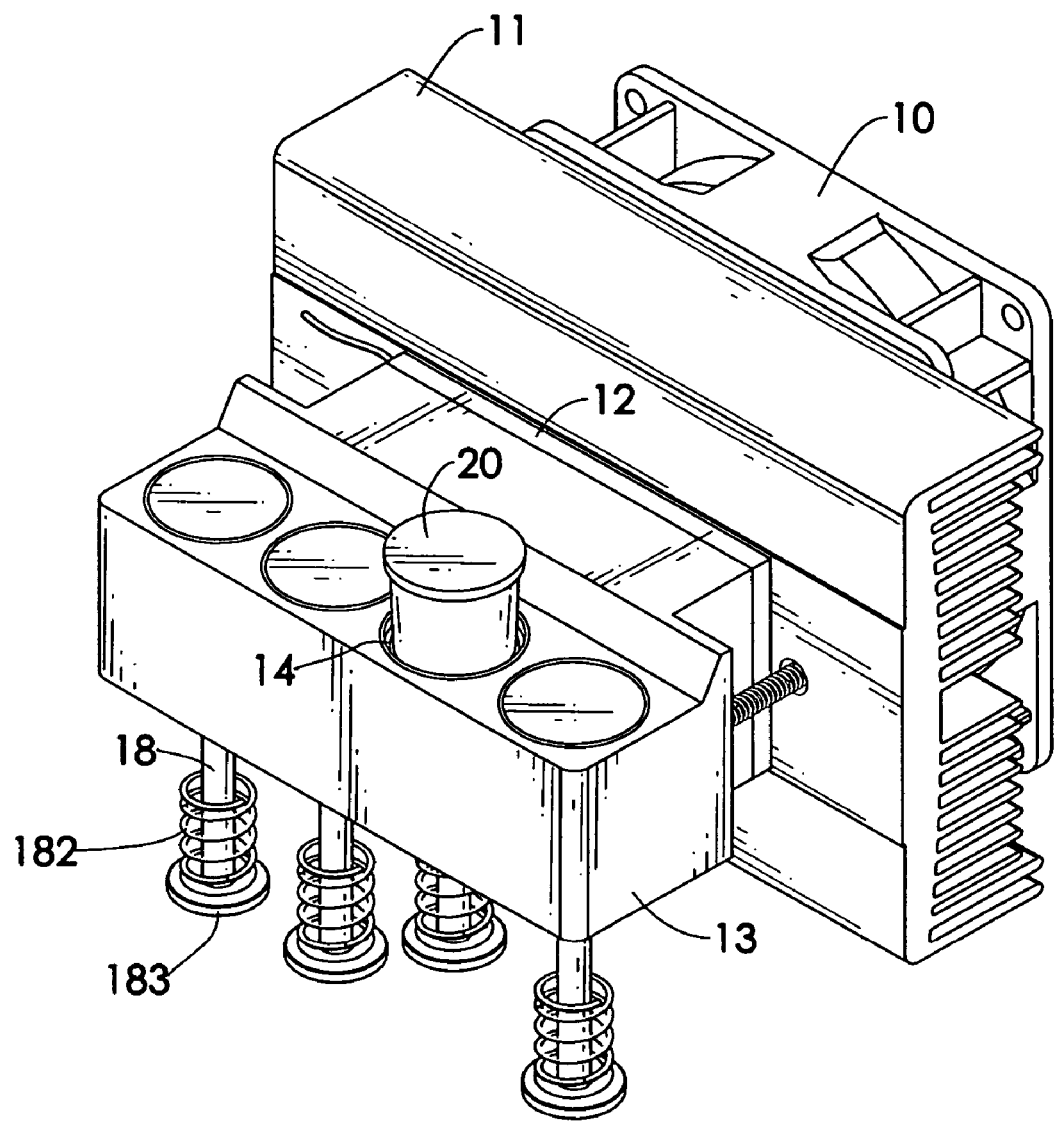
FIG. 1 is a perspective view of an ice cube maker in accordance with the present invention.
Figure 2:
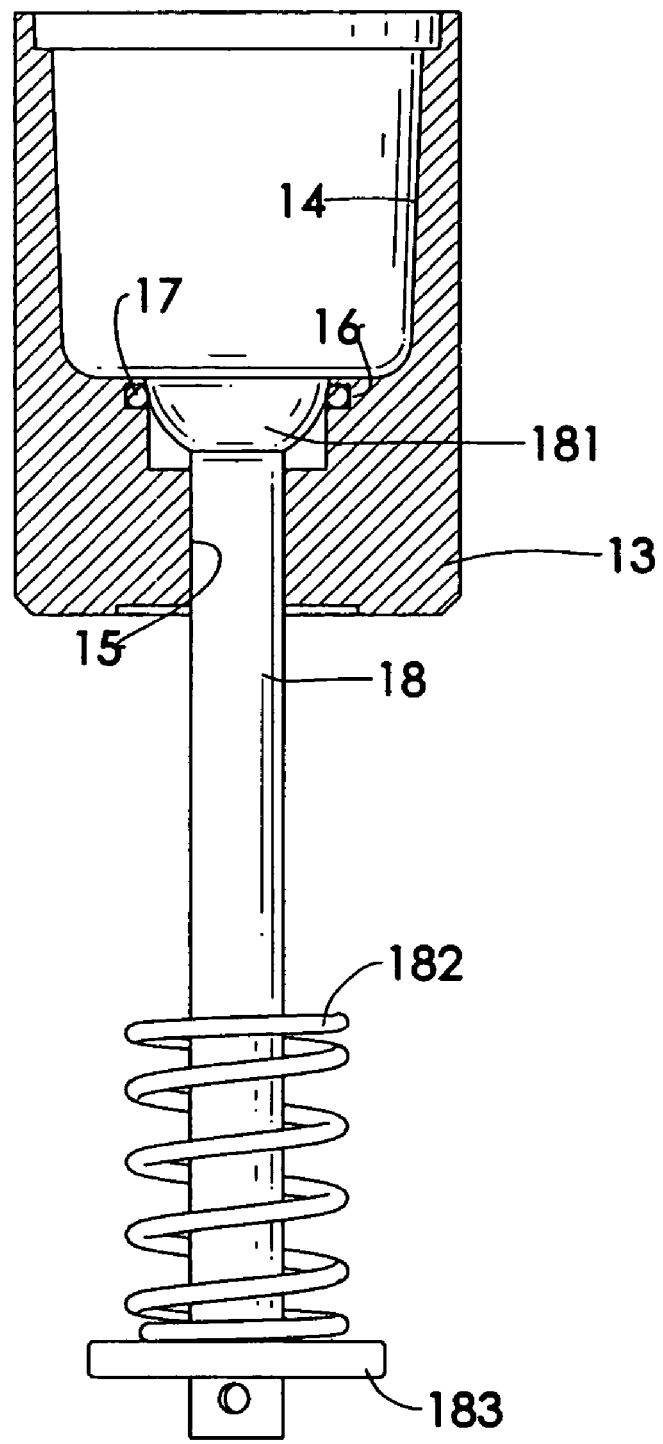
FIG. 2 is a side view in a partial section of an ice tray of the ice cube maker in FIG. 1.

With reference to FIGS. 1 and 2, an ice cube maker in accordance with the present invention comprises an ice tray (13), a thermoelectric cooling chip (12), a heat sink (11) and a fan (10).

The ice tray (13) has an exterior side, a top surface, multiple recesses (14) and multiple push rods (18). Each recess (14) is formed separately in the top surface of the ice tray (13), may be cone-shaped and has a bottom, a through hole (15), an optional seal recess (16) and an optional seal (17). The through hole (15) is formed through the bottom of the recess (14). The seal recess (16) is formed in the bottom of the recess (14). The seal (17) is mounted in the seal recess (16).

Each push rod (18) is mounted slidably in the through hole (15) and has an inner end, an outer end, a head (181), a flange (183) and a spring (182). The head (181) is attached to the inner end of the pushing rod (18). The flange (183) is mounted at the outer end of the pushing rod (18). The spring (182) is mounted around the push rod (18) at the outer end of the pushing rod (18) between the flange (183) and the ice tray (13).

The thermoelectric cooling chip (12) has a cooling side. The cooling side of the thermoelectric cooling chip (12) is mounted on the exterior side of the ice tray (13) and draws heat from the ice tray (13). The fan (10) and the heat sink (11) are mounted sequentially on the thermoelectric cooling chip (12).

Figure 3:
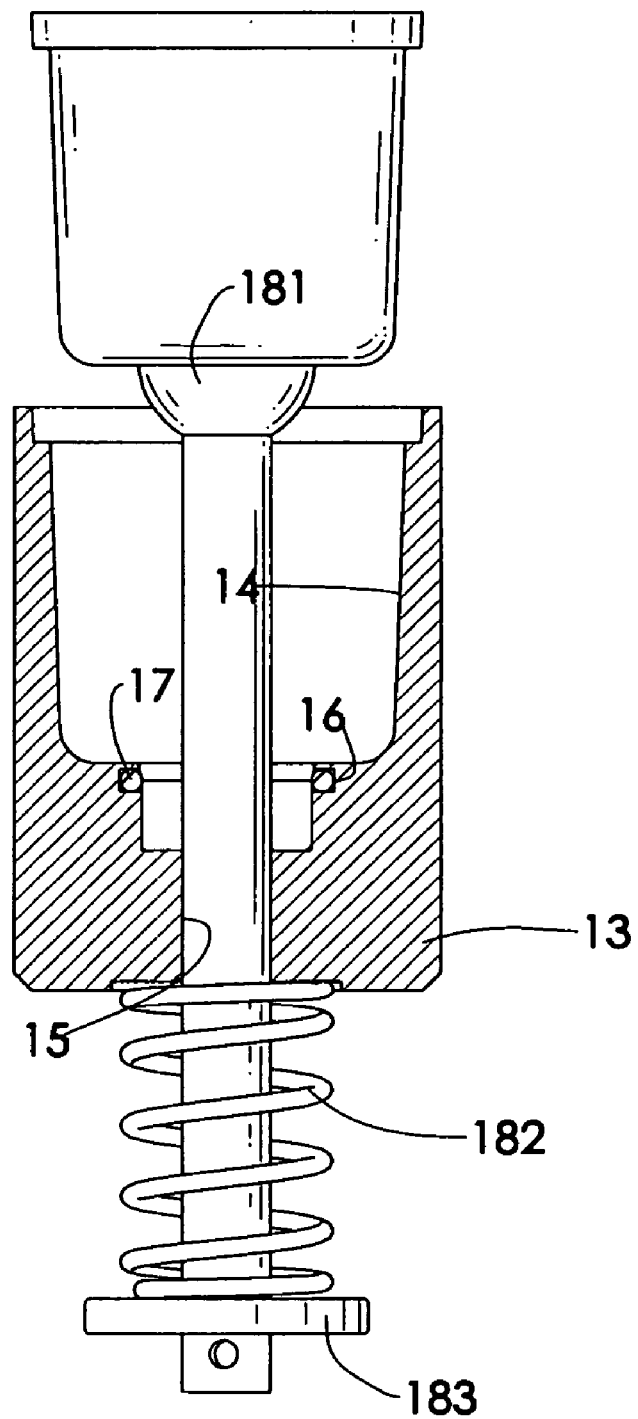
FIG. 3 is a side view in the partial section of the ice tray of the ice cube maker in FIG. 1 when an ice cube is pushed out of a recess.

With further reference to FIGS. 2 and 3, liquid is placed in each recess (14) to make ice cubes (20). Heat is drawn from the liquid through the ice tray (13) by the thermoelectric cooling chip (12) and freezes the liquid. Heat from the thermoelectric cooling chip (12) is dissipated by the heat sink (11) and the fan (10). After the liquid freezes, the ice cubes (20) are done. The push rod (18) is forced to move upward with an external force, such as a hand pushing power or a pushing power provided from a motorized driving device. Consequently, the head (181) of the push rod (18) pushes the ice cubes (20) out of the recesses (14) in the ice tray (13) and compresses the spring (182). When the ice cubes (20) are totally out of the recesses (14) of the ice tray (13), the spring (182) pushes the push rod (18) back and seats the head (181) in the bottom of the recess (14).

Furthermore, the ice cube maker is small enough so people can make ice cubes (20) anywhere that has a source of power to drive the thermoelectric cooling chip (12). The ice cube maker is used only to make ice cubes (20), and the ice cubes (20) will not pick up any strange smell.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. An ice cube maker assembly comprises
   an ice tray having
      an exterior side;
      a top surface;
      multiple recesses, each recess formed separately in the top surface of the ice tray and having
         a bottom; and
         a through hole formed through the bottom of the recess in the ice tray;
      multiple push rods, each pushing rod mounted slidably in one of the through holes and having
         an inner end;
         an outer end;
         a head formed at the inner end of the pushing rod;
         a flange mounted at the outer end of the push rod; and
         a spring mounted around the push rod at the outer end between the flange and the ice tray;
   a thermoelectric cooling chip having a cooling side mounted on the exterior side of the ice tray;
   a heat sink mounted on the thermoelectric cooling chip; and
   a fan mounted on the heat sink.

2. The ice cube maker as claimed in claim 1, wherein the recesses are cone-shaped.

3. The ice cube maker as claimed in claim 1, wherein each recess further has a seal recess formed at the bottom of the recess and a seal mounted in the seal recess.

4. The ice cube maker as claimed in claim 2, wherein each recess further has a seal recess formed at the bottom of the recess and a seal mounted in the seal recess.

* * * * *